US006484251B1

(12) United States Patent
McDonald et al.

(10) Patent No.: US 6,484,251 B1
(45) Date of Patent: Nov. 19, 2002

(54) UPDATING CONDITION STATUS REGISTER BASED ON INSTRUCTION SPECIFIC MODIFICATION INFORMATION IN SET/CLEAR PAIR UPON INSTRUCTION COMMIT IN OUT-OF-ORDER PROCESSOR

(75) Inventors: Robert Greg McDonald, Austin, TX (US); Peichun Peter Liu, Austin, TX (US); Christopher Hans Olson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/417,824

(22) Filed: Oct. 14, 1999

(51) Int. Cl.[7] .................................................. G06F 9/38
(52) U.S. Cl. ...................... 712/23; 712/221; 712/222; 708/495; 708/498; 708/499
(58) Field of Search ................................ 708/495, 498, 708/499; 712/23, 221, 222

(56) References Cited

U.S. PATENT DOCUMENTS 5,826,070 A * 10/1998 Olson et al. ............... 712/217
6,021,488 A * 2/2000 Eisen et al. ................ 712/222
6,151,669 A * 11/2000 Huck et al. ................ 708/495

* cited by examiner

Primary Examiner—Kenneth S. Kim
(74) Attorney, Agent, or Firm—Joseph P. Lally; Anthony V. S. England

(57) ABSTRACT

A processor including a register, an execution unit, a temporary result buffer, and a commit function circuit. The register includes at least one register bit and may include one or more sticky bits. The execution unit is suitable for executing a set of computer instructions. The temporary result buffer is configured to receive, from the execution unit, register bit modification information provided by the instructions. The temporary result buffer is suitable for storing the modification information in set/clear pairs of bits corresponding to respective register bits of the register. The commit function circuit is configured to receive the set/clear pairs of bits from the temporary result buffer when the instruction is committed. The commit function circuit is suitable for generating an updated bit in response to receiving the set/clear pairs of bits. The updated bit is then committed to the corresponding register bit of the register.

22 Claims, 7 Drawing Sheets

UPDATING CONDITION STATUS REGISTER BASED ON INSTRUCTION SPECIFIC MODIFICATION INFORMATION IN SET/CLEAR PAIR UPON INSTRUCTION COMMIT IN OUT-OF-ORDER PROCESSOR

BACKGROUND

1. Field of the Present Invention

The present invention generally relates to the field of microprocessors and more particularly to a method of handling register updates in an out of order processor.

2. History of Related Art

Out-of-order processors are well known in the field of microprocessor based computer systems. In an out-of-order processor, instructions may be executed in an order that differs from the program order of the instructions. Out-of-order execution is facilitated through the use of register renaming techniques and the storage of results in a temporary storage facility until the instruction is committed. The presence of special purposes bits such as sticky bits in a register complicates out-of-order execution because of the manner in which sticky bits are updated. Whereas conventional or non-sticky bits are generally updated each time the corresponding register is updated, sticky bits may be unaffected by operations that update other bits in the register. Some instructions leave the value of a sticky bit unchanged whereas other instructions explicitly set or clear the sticky bit. Conventional methods of handling out-of-order execution typically contemplate that a single bit of information provided by the instruction is sufficient to indicate the state in which the corresponding bit of a register should be after the instruction is committed. Thus, if the instruction provides a 0 associated with a particular register bit, the value of the register bit after the corresponding instruction is committed will be 0. In the case of a sticky bit, however, the state of the sticky bit after an instruction is committed is a function of the state of the sticky bit before the instruction was executed as well as the value of a corresponding bit of information in the instruction. It will be appreciated that this characteristic of sticky bits adds an additional layer of complexity in processors enabled to execute instructions out-of-order. To address the issues introduced by the presence of sticky bits, conventional processors typically incorporate complex commit circuitry to determine the type of instruction that is being executed. Once the instruction type is determined, the commit circuitry according to the prior art can interpret the data that is associated with the operation. As an example, a 0 data bit may indicate that the corresponding register bit is to be written with a 0 for one type of operation while a 0 in the same data bit location may simply indicate that the value of the corresponding register bit is to remain unchanged for another type of operation.

An example of a conventional commit circuit 600 according to the prior art is depicted in FIG. 6. In the depicted circuit, a set of data bits 602 and a set of control bit 604 comprise the input to commit function 600. The data bits 602 are routed in parallel through a set of functional circuits 606. Each function in the set of functional circuits 606 produces a corresponding output dependent on the value of the data bits 602. The output of each of the functions in the set of functional circuits 606 is routed to a multiplexer 608. The control bits 604 are decoded in a decoder circuit 610 to produce a select signal 612 that selects one of the set of functional circuits 606 in multiplexer 608. The output of the selected function then becomes the output of commit function 600 that is then committed to the appropriate register. It will be appreciated by those skilled in the field of microprocessor circuit design that the commit function 600 includes expensive and otherwise undesirable complexity that increases the die size of the microprocessor and can negatively impact processor performance. Therefore, it would be advantageous to design a system capable of committing operations and updating register bits (including sticky bits) in an out of order processor without requiring the presence of a complex and expensive logic circuit.

SUMMARY OF THE INVENTION

The issues identified above are in large part addressed by a method and processor that enable efficient management of multiple, out-of-order, speculative, and arbitrary updates to a register that includes "sticky" bits and "summary" bits. Broadly speaking, the processor includes a register, an execution unit, a temporary result buffer, and a commit function circuit. The register includes at least one register bit and may include one or more sticky bits. Sticky bits as used herein, are special purpose register bits that, once set, will remain set until they are explicitly cleared by a special instruction. The execution unit is suitable for executing a set of computer instructions. The temporary result buffer is configured to receive, from the execution unit, register bit modification information provided by the instructions. The temporary result buffer is suitable for storing the modification information in set/clear pairs of bits corresponding to respective register bits of the register. The commit function stage includes a set of commit function circuits configured to receive the set/clear pairs of bits from the temporary result buffer when the instruction is committed. Each commit function circuit is suitable for generating an updated bit in response to receiving the set/clear pairs of bits. The updated bit is then committed to the corresponding register bit of the register.

Preferably, each commit function circuit is configured to generate a "1" if the set bit of the set/clear pair is asserted and further configured to generate a "0" if the clear bit of the set/clear pair is asserted. In one embodiment, each commit function circuit is configured to receive the existing value of the register bit from the register. The value of the updated bit equals the existing value if neither the set bit nor the clear bit of the set/clear pair is asserted. In one embodiment suitable for its simplicity, a commit function circuit includes an OR gate and an AND gate. The OR gate is configured to receive the existing value of the register bit and the set bit of the set/clear pair as inputs. The AND gate is configured to receive the output of the OR gate and the inverse of the clear bit as inputs. The output of the AND gate serves as the updated bit that is then recorded in the appropriate register bit of the register.

In the preferred embodiment, the temporary result buffer includes multiple entries. In this embodiment, each instruction is associated with a tag. The tag indicates the entry in the temporary result buffer where instruction information, including the register bit modification information, will be stored. In one embodiment, the processor is adapted to associate multiple instructions with a common tag such that multiple instructions share a common entry in the temporary result buffer. The processor and the execution unit are preferably configured to execute instructions out-of-order and speculatively to achieve optimal processor performance.

Utilizing the processor and the data processing system in which the processor is embodied, the invention further contemplates a method of managing register bit modification in an out-of-order capable processor. The method includes executing a set of instructions and recording register bit modification information provided by each of the instructions in set/clear pairs of bits that correspond to each of one or more register bits in the register. Thereafter, for each instruction in the set of instructions, the register bits are updated based on the modification information when the instruction is committed. Preferably the register bit modification information is recorded by storing the information in one of multiple entries in a temporary buffer. The selected entry in the temporary result buffer is preferably determined based upon a tag that corresponds to the instruction. Multiple instructions may correspond to the same temporary result buffer tag and, thereby, share a common entry in the result buffer. The updating of register bit information preferably includes generating an updated bit with a commit function circuit that is configured to receive the set/clear pair of bits as inputs. In a presently preferred embodiment, the updated bit is set to "1" if the set bit of the set/clear pair corresponding to the instruction being committed is asserted and "0" if the clear bit set/clear pair is asserted. If neither the set nor the clear bit is asserted, the existing value of the register bit prior to the updating function becomes the updated bit such that the register bit remains unchanged if neither the set bit nor the clear bit is asserted.

BRIEF DESCRIPTION OF THE DRAWINGS

Other objects and advantages of the invention will become apparent upon reading the following detailed description and upon reference to the accompanying drawings in which.

Figure 1:
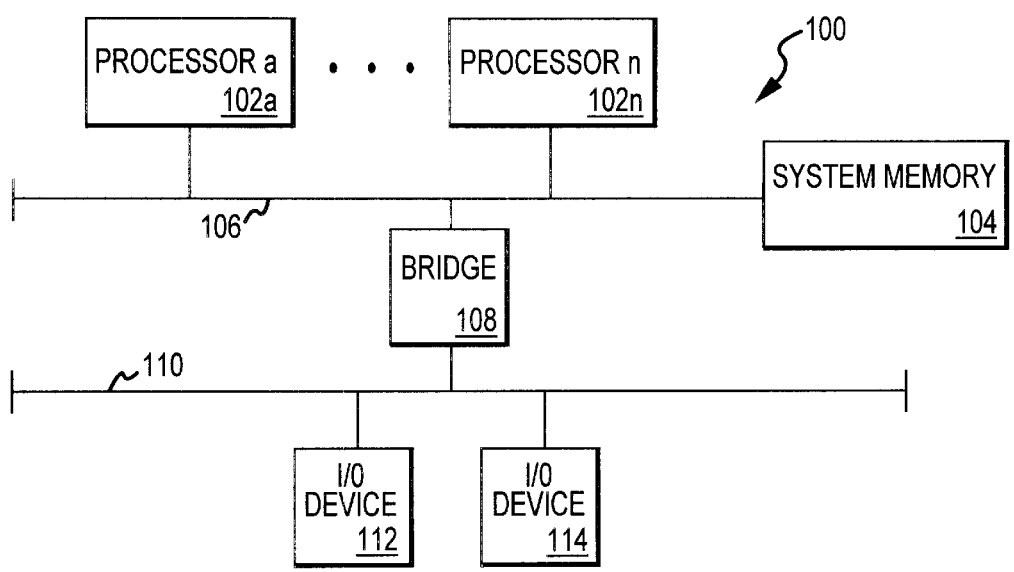
FIG. 1 is a simplified block diagram of a data processing system including a processor according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 is a simplified block diagram of a data processing system 100 including one or more processors 102a, ..., 102n (generically or collectively referred to as processors or processor 102) according to one embodiment of the invention. Each processor 102 may be compatible with any of a variety of processor family architectures including as examples a RISC-based architecture such as the RS/6000 family of processors available from IBM Corporation or a CISC-based such as the Motorola 6800 family of microprocessors, the PowerPC family of processors from IBM Corporation, as well as the x86 family of processors available from a number of sources. Specifics of processor 102 as contemplated by the present invention are discussed in greater detail below. A system memory 104 is accessible to each processor 102 over a system bus 106. Data processing system 100 may include a memory control unit (not shown) between system memory 104 and processors 102. In other embodiments, the memory control function may be integrated into each processor 102 or into system memory 104. An I/O bridge 108 facilitates communication between system bus 106 and at least one I/O bus 110. In addition, I/O bridge 108 may serve as an arbiter of access to I/O bus 110. I/O bus 110 may comply with any of a variety of industry standard I/O bus architectures including, as examples, the PCI, AGP, MCA, ISA, and EISA bus architectures. In one embodiment, at least one I/O bus 110 complies with PCI Local Bus Specification Rev 2.2 and PCI-X Addendum 1.0, both available from the PCI Special Interest Group 2575 N.E. Kathryn Street #17, Hillsboro, Oreg. 97124 (website: www.pcisig.com).

Data processing system 100 includes one or more input devices such as a keyboard or mouse represented in FIG. 1 by I/O device 112, and an output device such as a display terminal represented in FIG. 1 by I/O device 114. Those familiar with microprocessor based computer design will appreciate that although FIG. 1 depicts a specific arrangement of I/O devices and I/O buses, a wide variety of alternative embodiments are contemplated for use with the present invention. As examples, data processing system 100 may include multiple bridges such as bridge 108 and multiple I/O buses such as I/O bus 110 wherein numerous I/O devices may be coupled to each of a plurality of I/O buses. Examples of suitable I/O devices include: hard disk controllers, graphics adapters, video controllers, audio adapters, high-speed network interfaces, CD ROM or DVD controllers, as well as a variety of other well known I/O devices. It will be further appreciated that although the embodiment of data processing system 100 depicts a symmetrical multiprocessor (SMP) architecture in which each of the processors 102 has essentially equivalent access to system memory 104, data processing system 100 may be implemented with an architecture such as a non-uniform memory architecture (NUMA) in which the system memory is distributed with respect to the processors 102 such that each processor has a relatively fast or inexpensive access to a local portion of the system memory and a relatively slow or expensive access to the remaining portions of system memory, which are local to other processors 102 in the system.

Regardless of the specific implementation of processors 102 or the arrangement of I/O buses in I/O peripheral devices, the processor 102 of data processing is designed to efficiently handle multiple, out-of-order, speculatively executed instructions that effect the contents of a register that may include one or more sticky bits.

Figure 2:
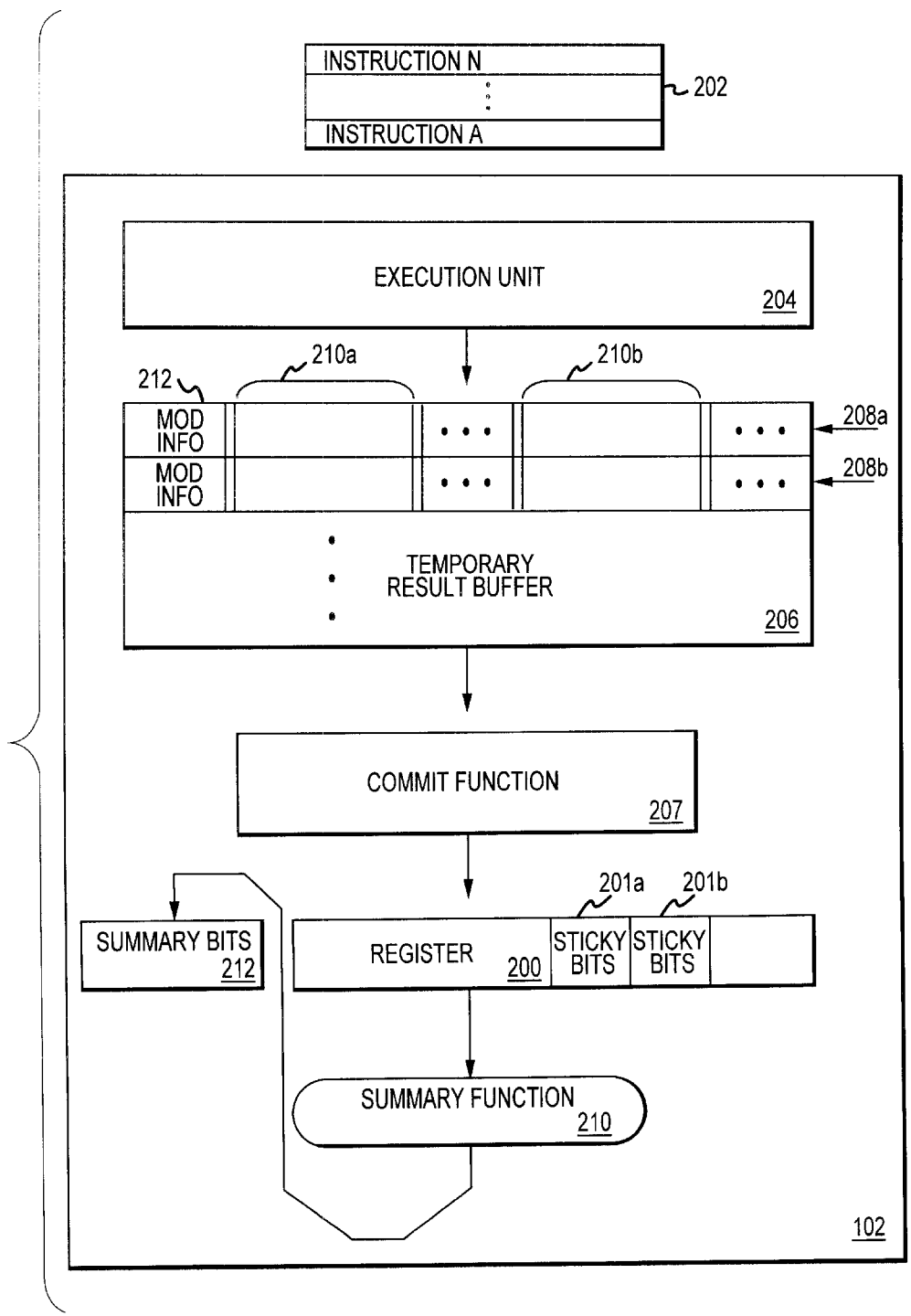
FIG. 2 is a simplified block diagram of a processor including facilities for handling register bit modification information according to one embodiment of the present invention.

Turning now to FIG. 2, a simplified block diagram of one embodiment of a processor 102 according to the present invention is depicted. In the depicted embodiment, processor 102 includes a register 200 that includes one or more sticky bits 201a, 201b . . . (collectively or generically referred to as sticky bits or sticky bit 201). In addition, processor 102 includes an execution unit 204, a temporary result buffer 206, and a commit function stage 207. The execution unit 204 includes one or more functional units such as ALUs, load/store units, floating point units, and branch units. Execution unit 204 is preferably adapted to perform out-of-order and speculative execution of a set of instructions indicated in FIG. 2 by reference numeral 202. As will be appreciated by those familiar with microprocessor architectures, the set of instructions 202 may be executed in an order of execution that varies from the program order of the set of instructions 202 such that an instruction A that proceeds an instruction N in program order may be executed in execution unit 204 after the execution of instruction N. Upon executing each of the instructions in the set of instructions 202, execution unit 204 provides information such as data, address, status, and control information to a temporary result buffer 206, where the information will reside until the corresponding instruction is committed (or deallocated in the case of a speculatively executed instruction that was mis-predicted).

In the preferred embodiment, temporary result buffer 206 includes multiple entries 208a, 208b . . . (collectively or generically referred herein as entries 208). In one embodiment, the information stored in each entry 208 of temporary result buffer 206 corresponds to an instruction of instruction set 202. In another embodiment, multiple instructions may share a single entry 208. The embodiment depicted in FIG. 2 includes information corresponding to multiple instructions 210a, 210b, etc. Each entry 208 includes register bit modification information indicated by reference numeral 212.

Figure 7:
FIG. 7 is a representation of modification information stored according to one embodiment of the present invention.
Figure 6:
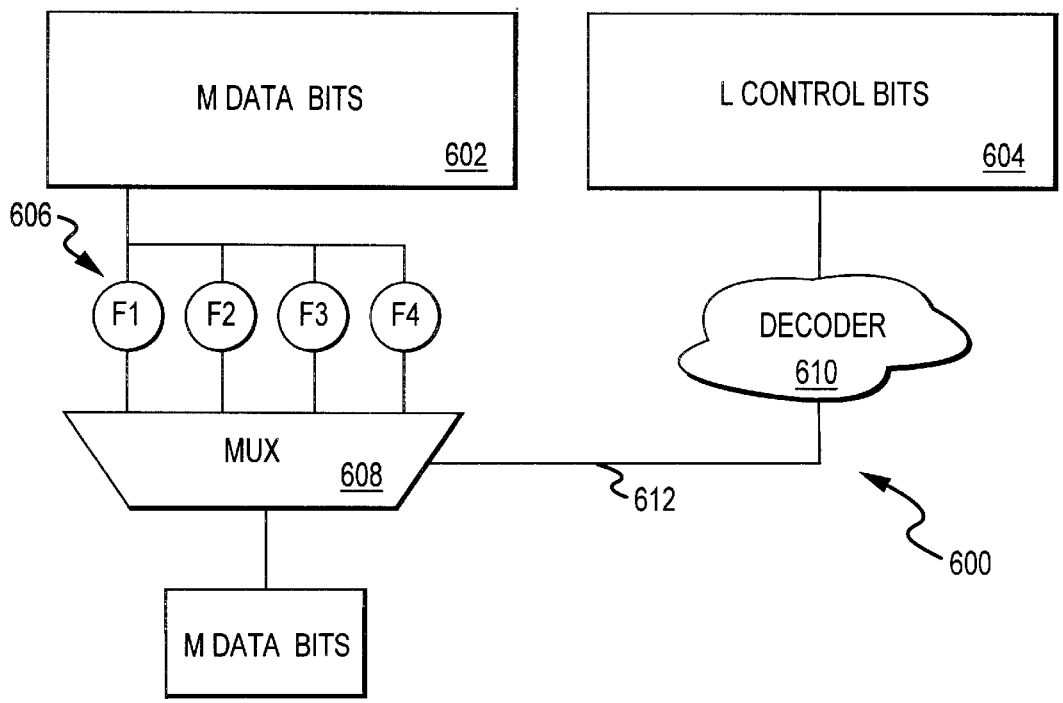
FIG. 6 is a representation of a commit function circuit according to the prior art.

Turning momentarily to FIG. 7, register bit modification information 212 according to the presently preferred embodiment comprises a plurality of set/clear pairs 213a . . . 213k (collectively or generically referred to as set/clear pair(s) 213). Each set/clear pair 213 includes a corresponding set bit 215 and a clear bit 217. In one embodiment, register bit modification information 212 includes a set/clear pair 213 for each bit in the register 200. In this embodiment, each bit of information in register 200, whether or not the register bit is a sticky bit, will be recorded in register bit modification information 212 as a set/clear pair 213. This embodiment, while utilizing additional resources, is desirable in its flexibility to indicate an effect arbitrary changes to the register bit values. As an example, the PowerPC architecture from IBM Corporation implements numerous registers that include sticky bits. The architecture permits a variety of types of updates to these registers depending upon which instruction is being executed. Permitted updates include the setting of any single conventional or non-sticky bit, clearing any single conventional bit, overriding specific bit fields, overriding ever bit, and setting one or more sticky bits. The embodiment of processor 102 that incorporates a set/clear pair 213 for each bit in register 200 facilitates updating by accommodating multiple types of operations with a single consistent information update format that greatly simplifies the design of the commit function stage 208 as discussed in greater detail below. When an instruction or group of instructions 210 sharing a common entry 208 in temporary result buffer 206 are ready to be committed, the information in the appropriate entry 208, including the modification information 212, is provided to a commit function stage 207.

Figure 4:
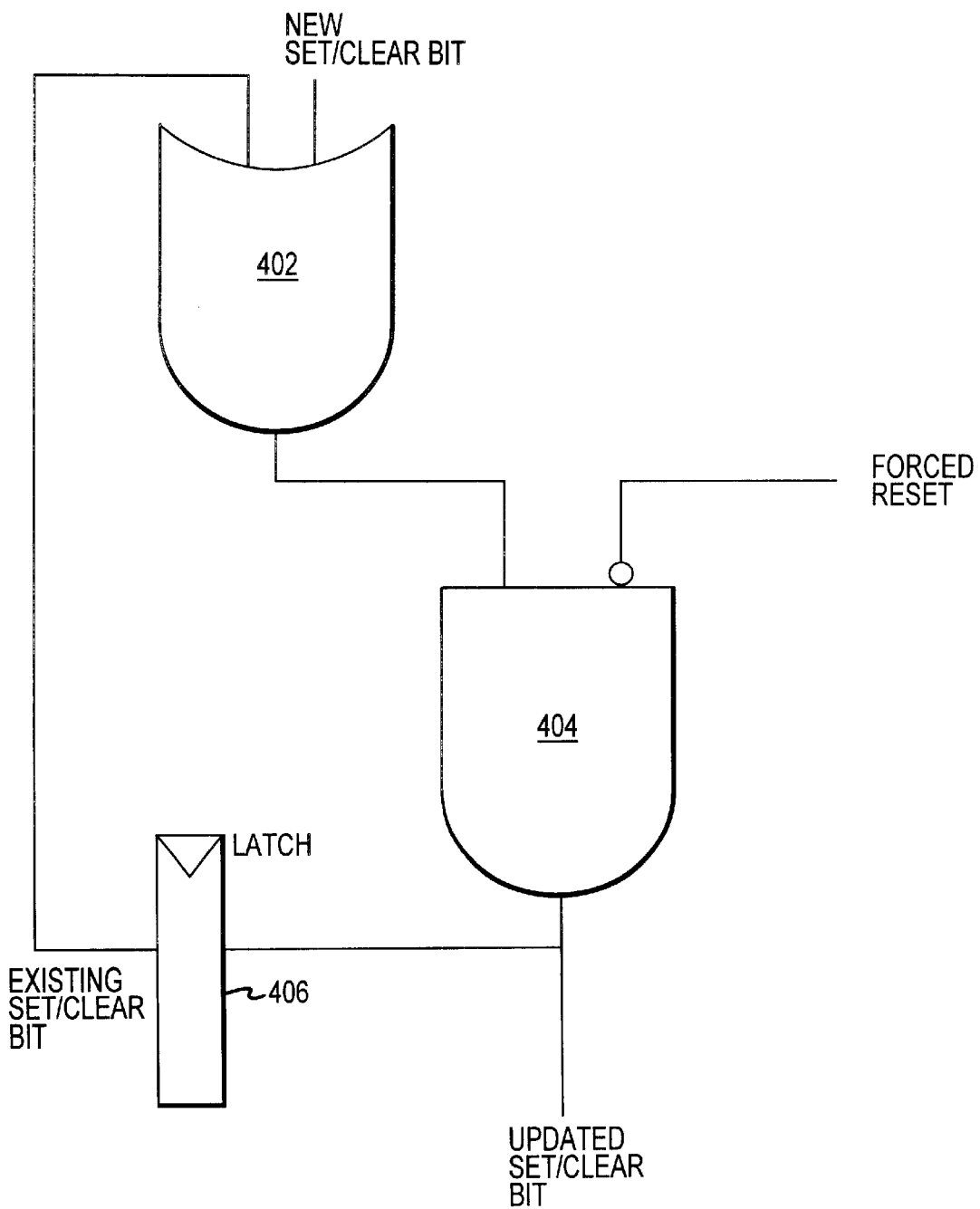
FIG. 4 is a logic diagram of a register bit update circuit suitable for use in an embodiment of the processor of FIG. 2 in which multiple instructions are stored in a common temporary result buffer entry.

In an embodiment in which multiple instructions share a common entry 208 in temporary result buffer 206, a circuit such as the register bit update circuit 400 depicted in FIG. 4 is used to maintain the modification information 212. An update circuit 400 is incorporated for each set bit and each clear bit in modification information 212. When a second, third, or subsequent instruction is stored in an entry 208 of temporary result buffer 206, the existing modification information in the entry 208 is updated based on the modification information corresponding to the incoming instruction (the new instruction). More specifically, for each set/clear bit in modification information 212, the existing set/clear bit is logically ORed with the corresponding set clear bit of the new instruction in OR gate 402. The output of OR gate 402 drives AND gate 404. Preferably, each of the set/clear bits can be forcibly reset with a forced reset input to AND gate 404. The output of AND gate 404 becomes the updated value of the set/clear bit in modification information 212. The updated value is fed back to OR gate 402 through a latch 406 such that the updated value becomes the existing value in the next cycle. In this manner, temporary result buffer 206 can accommodate multiple instructions re-entry with a single field for modification information 212.

Figure 3:
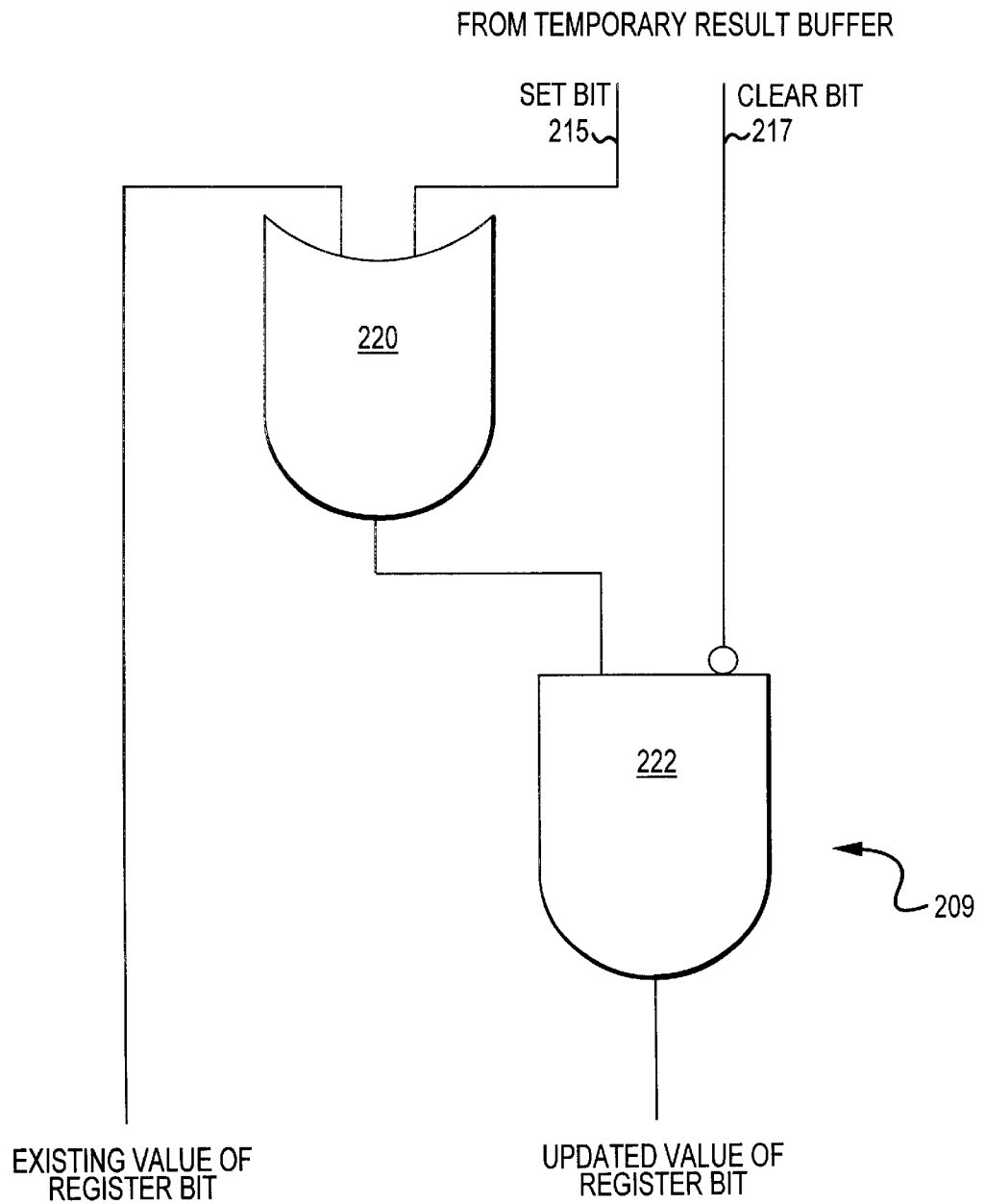
FIG. 3 is a circuit diagram of one embodiment of the commit function circuit of the processor of FIG. 2.

Turning to FIG. 3, a logic block diagram of a commit function circuit 209 of commit function stage 207 according to the presently preferred embodiment of the invention is shown. In the depicted embodiment, commit function circuit 209 is implemented with just a single two-input OR gate 220 and 2 input AND gate 222. Commit function stage 207 preferably includes a unique commit function circuit 209 for each bit in register 200. The OR gate 220 receives set bit 215 from temporary result buffer 206 as a first input. The second input of OR gate 220 is fed back from the existing value of the appropriate bit within register 200. With this arrangement, it will be appreciated that the output of OR gate 220 is a one if either the set bit 215 or the existing value of the bit in register 200 is one. The output of OR gate 220 is routed to the first input of AND gate 222. The second input of AND gate 222 in the preferred embodiment is an inverted copy of clear bit 217. Thus, if clear bit 217 is asserted (driven to one), the inverted copy of clear bit 217 that drives the second input of AND gate 222 will force the output of AND gate 222 to 0. Similarly, if neither the set bit nor the existing value of the register bit is 1, the output of OR gate 222 will be 0 thereby driving the output of AND gate 222 to 0.

Figure 8:
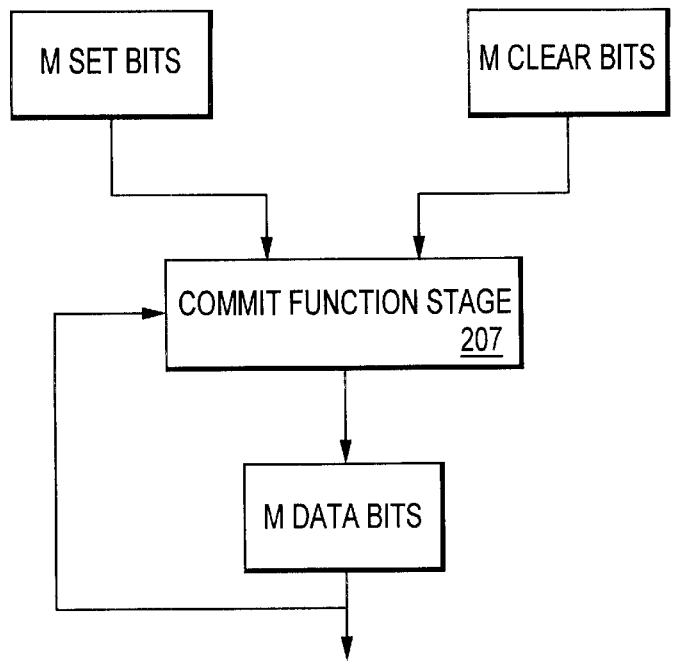
FIG. 8 depicts a commit function circuit according to one embodiment of the present invention.

The function of each commit circuit 209 may be summarized by noting that, if the set bit 215 is asserted, the updated value of the bit of register 200 at the output of AND gate 222 is driven to 1. If clear bit 217 is asserted, the output of AND gate 222 is driven to "0". If neither set bit 215 or clear bit 217 is asserted, the updated value of the register bit will be the existing value of the register bit. In the preferred embodiment, the condition where set bit 215 and clear bit 217 are asserted simultaneously is prohibited. Thus, although the particular logic block depicted in FIG. 3 would indicate that clear bit 217 has priority over set bit 215 (i.e., asserting clear bit 217 will result in a 0 in the appropriate register bit regardless of the status of set bit 215) the preferred embodiment prevents this type of contention. Referring briefly to FIG. 8, commit function stage 207 as contemplated herein should be contrasted with the complex commit function 600 of conventional processors discussed previously. It will be appreciated that commit function stage 207 consumes significantly less area of the processor die size than commit function 600 and is capable of executing at extremely high speeds. As processors approach gigahertz speed, it is highly desirable to eliminate unnecessary complexity wherever possible. Moreover, the design of commit function stage 207 is desirable for its implementation of a single mechanism for updating register bits, regardless of the type of bit being updated and regardless of the type of instruction being executed.

Figure 9A:
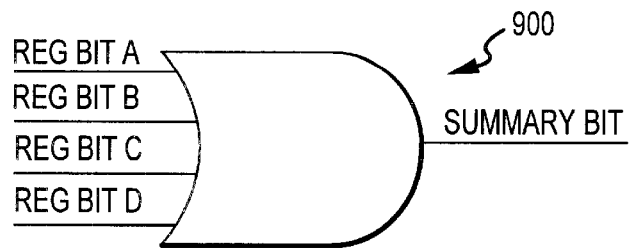
FIGS. 9A and 9B depict embodiments of summary function circuits according to an embodiment of the present invention.
Figure 9B:
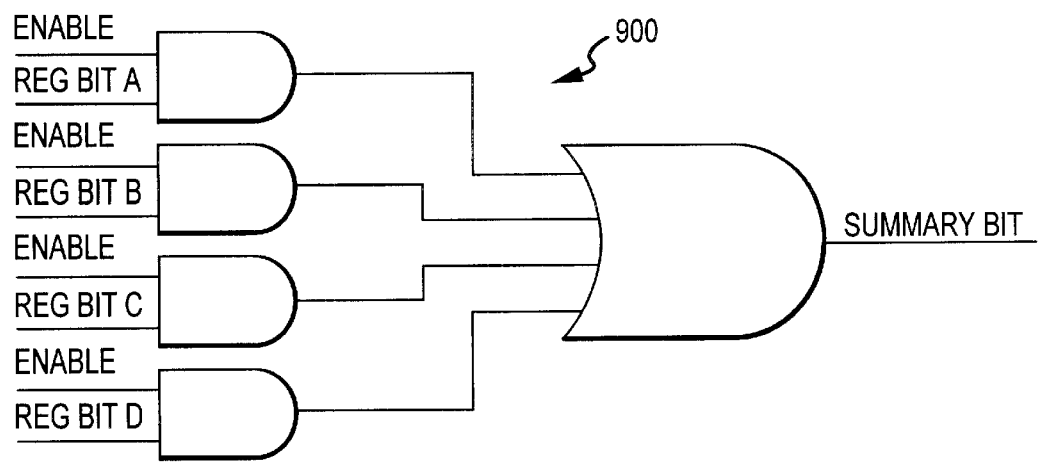

Returning now to FIG. 2, the depicted embodiment of processor 102 includes a summary function stage 210 and associated summary bits 212. In this embodiment, one or more bits in register 200 may serve as the inputs to one or more summary functions within summary function stage 210 to produce one or more summary bits that represent a composite of bits in register 200 according to some predetermined function. As examples, FIG. 9A depicts a summary function circuit 900 in which multiple register inputs a multiple input OR gate such that the summary function output recorded as one of the summary bits 212 comprises the logical OR of the inputs. In FIG. 9B, a slightly more complex summary function circuit 700 suitable for use in summary 210 incorporates multiple dual-input logical AND gates where each of the AND gate output serves as an input to an OR gate. This type of summary function circuit is suitable for masking one or more of the OR gate inputs. If, for example, each of the AND gate inputs includes an exception signal and a corresponding enable signal, only those exception signals that are enabled will affect value of the appropriate summary bit 212.

Figure 5:
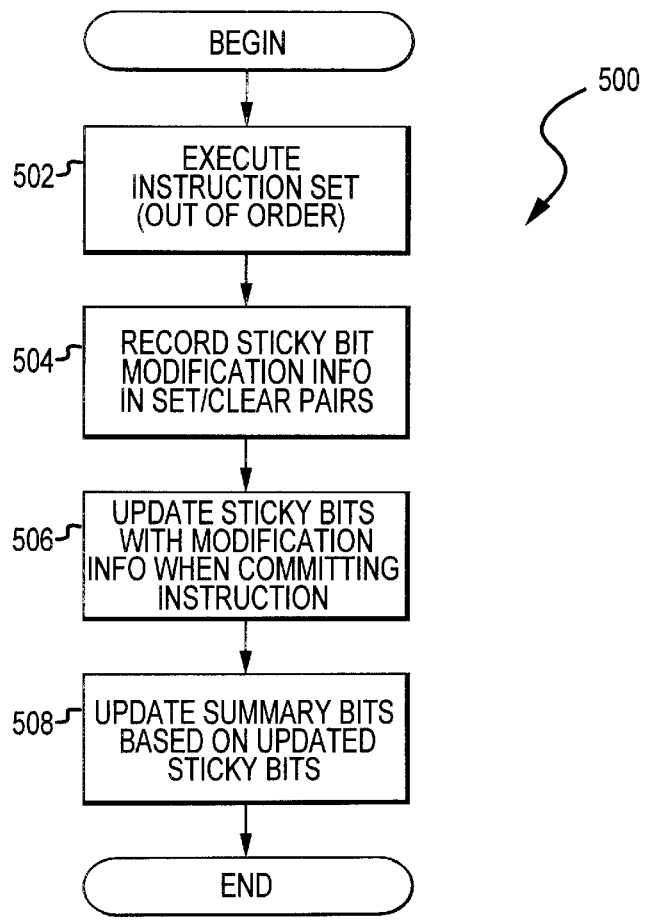
FIG. 5 is a flow diagram of a method of managing register bit modification information according to one embodiment of the present invention.

Turning to FIG. 5, a flow diagram summarizing a method 500 of maintaining and updating register bit information according to the invention is provided. Initially, a set of instructions are executed (step 502). The execution of the instruction set may be speculative and/or out-of-order. The execution of each instruction produces modification information including register bit information that may include sticky bit information. The register bit information is then recorded (step 504) in set/clear pairs of a temporary result buffer that is coupled to the execution unit. The modification information remains in a corresponding entry of the temporary result buffer until the instruction associated with the modification information is ready to be committed. Appropriate bits of the register are then updated (step 506) with the modification information recorded in the set/clear pairs of the temporary result buffer when the instructions are committed. In an embodiment in which register 200 includes one or more summary bits 212, the summary bit information is subsequently updated (step 508) when the corresponding sticky bits and conventional bits are updated. In the preferred embodiment, the updating of the sticky bits is accomplished by providing the appropriate sticky bit information to a commit function circuit as described previously with respect to FIG. 3.

It will be apparent to those skilled in the art having the benefit of this disclosure that the present invention contemplates a desirable improvement in the manner of handling arbitrary changes to a register that includes various types of register bits for use in an machine executing speculatively and out-of-order. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method, comprising:
   executing a set of instructions;
   recording register bit modification information provided by each of the set of instructions in set/clear pairs of bits corresponding to each register bit in a register; and
   for each instruction in the set of instructions, updating each register bit, based on the modification information, when the instruction is committed.

2. The method of claim 1, wherein at least one of the set of instructions is executed speculatively and out-of-order.

3. The method of claim 1, wherein the register bits include at least one sticky bit.

4. The method of claim 1, wherein the recording of register bit modification information includes storing the information in a selected entry of a multiple entry temporary result buffer.

5. The method of claim 4, wherein the selected entry is determined based on a tag corresponding to the instruction indicative of one the entries in the temporary result buffer.

6. The method of claim 5, wherein a group of instructions corresponds to the same temporary result buffer tag and share a common entry in the result buffer.

7. The method of claim 1, wherein the updating of register bit information comprises generating an updated bit with a commit function circuit configured to receive the set/clear pair of bits as inputs.

8. The method of claim 7, wherein the updated bit is (a) if the set bit of the set/clear pair corresponding to the instruction being committed is asserted, (b) "0" if the clear bit of the set/clear pair is asserted, and (c) the value of the register bit prior to the updating if neither the set bit nor the clear bit is asserted.

9. A processor comprising:
   a register including at least one register bit;
   an execution unit suitable for executing an instruction;
   a temporary result buffer configured to receive register bit modification information corresponding to the instruction from the execution unit and suitable for storing the modification information in set/clear pairs of bits corresponding to each of the at least one register bits of the register; and
   a commit function circuit configured to receive the set/clear pairs of bits from the temporary result buffer when the instruction is committed and suitable for generating an updated bit responsive thereto for storage in the corresponding register bit of the register.

10. The processor of claim 9, wherein the commit function circuit is configured to generate a "1" if the set bit of the set/clear pair is asserted and a "0" if the clear bit of the set/clear pair is asserted.

11. The processor of claim 10, wherein the commit function circuit is configured to receive the existing value of the register bit from the register and wherein the value of the updated bit equals the existing value if neither the set bit nor the clear bit is asserted.

12. The processor of claim 9, wherein the commit function comprises an OR gate configured to receive the register bit and the set bit of the set/clear pair as inputs and an AND gate configured to receive the output of the OR gate and the inverse of the clear bit as input puts, wherein the output of the AND gate comprises the updated bit.

13. The processor of claim 9, wherein the temporary result buffer comprises multiple entries and wherein the instruction is associated with a tag indicative of the entry in the temporary result buffer in which the modification information is stored.

14. The processor of claim 13, wherein the processor is adapted to associate multiple instructions with a common tag such that that the multiple instructions share a common entry in the temporary result buffer.

15. The processor of claim 9, wherein the processor is adapted to execute instructions speculatively and out-of-order.

16. The processor of claim 9, wherein at least one of the register bits comprises a sticky bit.

17. A data processing system including processor, memory, input and display, wherein the processor comprises:

an execution unit suitable for executing an instruction;

a temporary result buffer configured to receive register bit modification information corresponding to the instruction from the execution unit and suitable for storing the modification information in set/clear pairs of bits corresponding to each of the at least one register bits of the register; and a commit function circuit configured to receive the set/clear pairs of bits from the temporary result buffer when the instruction is committed and suitable for generating an updated bit responsive thereto for storage in the corresponding register bit of the register.

18. The system of claim 17, wherein the commit function circuit is configured to generate a "1" if the set bit of the set/clear pair is asserted and a "0" if the clear bit of the set/clear pair is asserted.

19. The system of claim 18, wherein the commit function circuit is configured to receive the existing value of the register bit from the register and wherein the value of the updated bit equals the existing value if neither the set bit nor the clear bit is asserted.

20. The system of claim 17, wherein the commit function comprises an OR gate configured to receive the register bit and the set bit of the set/clear pair as inputs and an AND gate configured to receive the output of the OR gate and the inverse of the clear bit as input puts, wherein the output of the AND gate comprises the updated bit.

21. The system of claim 17, wherein the temporary result buffer comprises multiple entries and wherein the instruction is associated with a tag indicative of the entry in the temporary result buffer in which the modification information is stored.

22. The system of claim 21, wherein the processor is adapted to associate multiple instructions with a common tag such that that the multiple instructions share a common entry in the temporary result buffer.

* * * * *